Patented Sept. 13, 1938

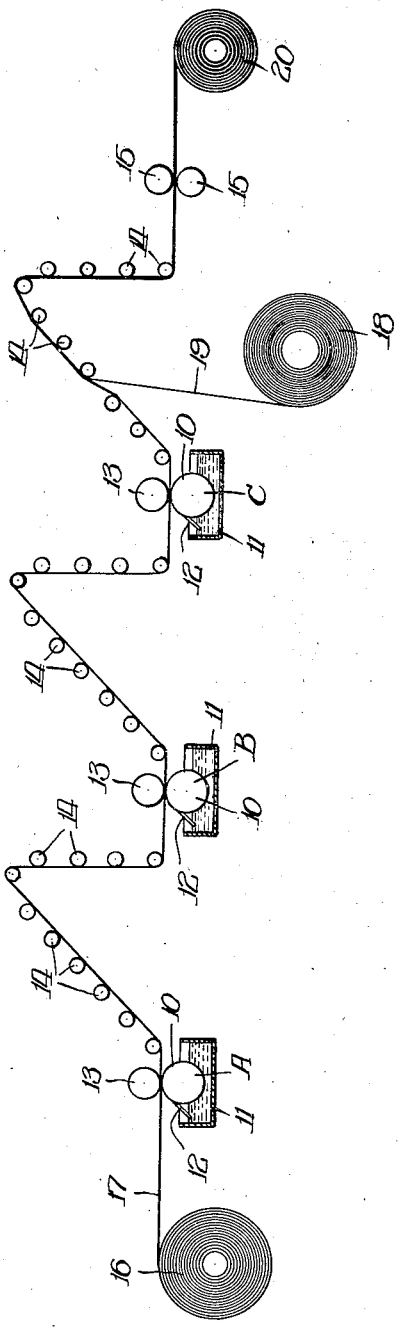

2,129,929

UNITED STATES PATENT OFFICE 2,129,929

LAMINATION

Irving Gurwick, Mount Vernon, Ohio, assignor to Shellmar Products Company, Mount Vernon, Ohio, a corporation of Delaware Application August 21, 1935, Serial No. 37,117

14 Claims. (Cl. 41—22)

The present invention pertains to a formation of composite articles and has particular reference to the lamination of regenerated cellulose, and the like, to paper and other materials.

Transparent cellulose sheeting has been employed widely in the packaging and wrapping of various commodities and the use of this material is highly desirable due to its bright and lustrous appearance. In certain cases the material is employed alone, but it has been recognized as highly desirable for many uses to laminate the transparent cellulose sheeting to a material, such as paper. The resulting composite article is considerably stronger than the cellulose alone and particularly desirable effects can be obtained by proper combinations of the cellulose sheeting and the base material. However, considerable difficulty has been encountered heretofore in producing a satisfactory laminated product.

A principal object of the present invention is to provide a laminated product consisting of cellulose sheeting and a sheet of dissimilar material, such as paper.

An additional object is the provision of a laminated product composed of regenerated cellulose sheeting and a dissimilar material, such as paper.

A further object is the lamination of regenerated cellulose sheeting with paper in such a manner that a firm bond is created between the two materials and objectionable curl is reduced to a minimum.

A still further object is the provision of a laminated product composed of transparent cellulose sheeting and paper having a decorative or predetermined design between the cellulose sheeting and the paper and acting as a bond therefor.

A still further object is the lamination of regenerated cellulose sheeting to paper by means of an intaglio printing unit and a relatively quick-drying and preferably lacquer ink.

These and other objects will be evident from a consideration of the following specification and by reference to the accompanying drawing in which the single figure is a more or less diagrammatic view of a device suitable for producing the product and carrying out the process of this invention.

In the production of a laminated product having on one side a web of transparent cellulose sheeting and on the other side a web of paper, several problems are involved. A satisfactory bond between the two materials must be obtained. Also, since the transparent cellulose sheeting and paper are dissimilar materials, there is a distinct tendency for the laminated product to curl. In practically every instance of a laminated material it is necessary to provide a decorative design between the paper and the cellulose sheeting. The cellulose sheeting enhances the appearance of the design, brightening the colors thereof and adding a surface luster of attractive appearance.

Although regenerated cellulose sheeting is more available than other types of cellulose sheeting, this material heretofore has not been successfully laminated. On the contrary, the problems of adhesion and curling have caused the art to resort to cellulose sheeting composed of cellulose derivatives, such as cellulose acetate. In the case of cellulose acetate, adhesives and bonding materials may be employed which will attack or bite into the cellulose acetate. Customarily, webs of cellulose acetate and paper are brought together under high pressure, a suitable adhesive being employed between the materials to produce a bond. Even in the case of cellulose acetate it has been difficult to reduce curling and to produce a firm bond between the materials.

As laminated products ordinarily must be provided with decorative designs and printed matter, it has been customary to print the paper to which it is desired to laminate the cellulose sheeting and subsequently to secure the cellulose sheeting over the printed portion of the paper, it being necessary to employ a transparent adhesive which will not prevent clear observation of the printed matter after the lamination.

In the accompanying drawing in which is illustrated, in a more or less diagrammatic manner, a machine of the type operable to produce a laminated product in accordance with my invention, there are provided a series of successive intaglio printing units indicated at A and B. Each of these units includes an etched cylinder 10 running in a color bath 11 and having a doctor blade 12 for removing excess color. Above the etched cylinder 10 is an impression roll 13 designed to effect proper contact between the web to be printed and the etched, color-carrying cylinder 10. Two color units have been illustrated, but it will be understood from the following description that any desirable number may be employed. Subsequent to the color units A and B is a final unit C which is similar to color units A and B except that the cylinder 10 preferably is provided with a continuous etch coextensive with the laminated area of the web.

Following each of the color units A, B and C are a series of idlers 14 forming the path of travel for the web to be printed and laminated. Preferably these idlers are spaced sufficiently close together to provide a steadying effect on a web passing through the machine. It will be seen that after passing through each of the units in a horizontal plane, the web will be carried through a more tortuous passage to provide time for drying of the web before the next color unit is reached.

Following the last of the rollers 14 are positioned draw rollers 15 which are driven at the desired speed.

In general, the construction of this device follows closely the construction of the intaglio printing device disclosed in my co-pending application Serial No. 682,923, filed July 31, 1933.

A roll of transparent regenerated cellulose sheeting, such as the product known as "Cellophane," is indicated at 16, a web 17 being taken from the roll and passed through the printing machine in the manner shown. As the web passes through the printing unit A it is provided with a suitable colored design, such as printed matter. Any suitable type of ink may be employed for this purpose. For example, the usual intaglio printing inks may be employed in the printing units. For instance, the lacquer inks of the type specified in my color-on-color patent, No. 1,867,314, may be employed. The first unit may be employed for printing one color of a multi-colored design. After passing through the unit A the web 17 travels along the first set of idlers 14 to the top idler, by which time the printed matter is dry. Suitable drying apparatus may be employed subsequent to the color unit. The web then passes through coloring unit B in a horizontal manner and a second color is applied in the usual manner. Ordinarily this color will be applied in a color-on-color manner with respect to the first color. The units A and B may complete the particular design it is desired to employ and thereafter the transparent cellulose sheeting passes in a horizontal manner through the unit C. The unit C is provided with an etched cylinder 10 in which the etching preferably extends completely around the cylinder and is of a width corresponding to the width of the laminated area. The material in the color bath 11 is a lacquer ink of a composition similar to the inks employed in units A and B. The doctor blade 12 scrapes off the excess ink as the cylinder 10 revolves and the intaglio ink from the color bath 11 is deposited on the web of cellulose sheeting in the same manner as the designs printed by units A and B. In this manner there is deposited on the web a background color of an intaglio ink.

The cellulose sheeting, after passing through the unit C, travels along the last set of idlers 14, as shown in the drawing. Below this last set of idlers is mounted a roll 18 of paper or other material to be laminated to the cellulose sheeting and from this roll is taken a web 19. The web 19 is brought together with the printed side of the cellulose sheeting before the last applied lacquer ink thereon has completely dried. As shown in the drawing, the web of paper and web of cellulose sheeting are brought together and passed over the idlers 14. In this manner the wet intaglio ink comes in contact with the fibrous paper under a relatively light degree of pressure but under sufficient pressure to cause the two webs to be secured together. The composite webs travel some distance under this relatively light pressure and then are gripped by the feed rollers 15 under a greater pressure. After passing through the feed rollers 15 the completely laminated web may be rolled up, as shown at 20.

The speeds of the webs as they come together are the same and, as bringing the webs together under high pressure is of importance in obtaining the proper bond, it appears that the two webs have an opportunity to adjust themselves slightly between the point of initial lamination and the draw rolls which exert a greater pressure. The plasticizer, which preferably is present in amount which may vary between 5 and 15 per cent, seems to assist in this respect.

In the printing of transparent cellulose sheeting, it is recognized as desirable to employ heat to assist in the sticking of the ink, particularly where a moistureproof coating is on the cellulose sheeting. A satisfactory bond between transparent cellulose sheeting and paper may be obtained without this substantial heat, and this factor also apparently contributes to the reduced curling. It is possible that the reason for this is that the cellulose sheeting undergoes less shrinkage when the extreme temperatures are not employed.

The solvents in the lacquer may be driven away to a considerable extent before contact of the paper with the cellulose sheeting, so long as the lacquer is sufficiently tacky to grip the paper. In fact, it appears that an increased gloss is obtained by driving off a considerable portion of the solvents before effecting the lamination.

In many cases it will be found desirable to employ a white color in the last unit C. Obviously, other colors may be employed. As an example of a suitable composition for the lacquer ink, reference is made to the following illustrative formula:

| | Per cent by volume |
|---|---|
| Ester gum solution | 60½ |
| Titanium dioxide solution | 15 |
| Tricresyl phosphate | 8 |
| Nitrocellulose solution | 7½ |
| Ethyl cellulose solution | 3½ |
| Methyl isobutyl ketone | 5½ |

I have found that the curling of laminated transparent cellulose sheeting and paper may be controlled to a substantial extent by proper adjustment of the plasticizer employed in the ink. In fact, proper adjustment of the plasticizer, which in the above example is tricresyl phosphate, may be employed to control the degree and direction of curl. By properly balancing the plasticizer with the other portions of the lacquer ink and the particular materials laminated, the nature of the final product can be controlled to a considerable extent.

It will be observed that the formula specified for the last color is substantially the same as the formula employed in lacquer inks such as used in units A and B.

When produced in the manner described the laminated product has a bond between the cellulose sheeting and paper which is quite secure. Also, the product is characterized by freedom of fish eyes or small uncemented portions which mar the appearance of a laminated product.

The nature of the deposit made by the etched cylinder of unit C is distinct in character. The etched cylinder, in fact, deposits the color unit. A gravure cylinder is composed of a multitude of small pockets which effect individual deposits of color on a web. The multitude of small pockets are filled with color in a substantially uniform manner and as the cylinder rotates in contact with the paper it acts to "lay" the color on the web. This prevents the running and streaking of the color and provides a uniform deposit which is particularly adherent.

It is not necessary that the union between the transparent cellulose sheeting and the paper be effected under the high pressures customarily employed in laminating. The webs come together under a relatively light pressure and apparently are substantially bonded together prior to the draw rolls 15. It is likely that this union under reduced pressure also reduces the amount of curling in the final product. The light pressure does not have the tendency to distort the webs and, therefore, when the webs set they are more nearly in their normal condition. The relatively heavy pressure exerted by the draw rolls 15 occurs at a stage when the bonding agent is in a more nearly dried condition and assists in the creation of a secure union between the two webs with a minimum of distortion. In this respect, the ink deposited by the etched cylinder is particularly suited for the described method of producing a union between the two webs of material.

It is possible to laminate the transparent cellulose sheeting to one side only of a relatively thin sheet of paper. I have laminated a web of regenerated cellulose to one side only of thin webs of paper of the nature of tissue paper with excellent results.

The described method is highly advantageous from the speed of production. In fact, commercial runs of the laminated product have been made with a speed equal to the speed at which the intaglio printing machines run without any lamination. This speed may be of the order of two hundred fifty feet per minute. The unprinted webs pass into the machine and emerge as printed and laminated material. It is not necessary to employ separate laminating machines and the entire operation is so simplified that substantially the only additional cost of the laminated product over printed transparent cellulose sheeting is the cost of the paper web. The material has proved to be highly desirable as a wrapping material for such products as soap. The laminated material has a high preservative capacity and by employing the proper type of webs substantially any desired wrapping material may be obtained. Additionally, the process may be employed to produce attractive advertising matter in which one or both sides of a sheet of paper are provided with the transparent cellulose sheeting.

In some cases it will be found desirable to produce a "spot weld" between the paper and the web of regenerated cellulose, and in such cases the etched cylinder C will have a predetermined design rather than a continuous etch. If it is desired to laminate the regenerated cellulose to paper in such a manner as to bring out and retain certain visual characteristics of the paper itself, the color deposited in the unit C may be omitted and a transparent ink employed instead. The desirable effects of the etched cylinder and method of producing the bond between the webs still will be obtained.

The roll 20 of the laminated product may be employed directly in wrapping machines or bag-making machines, in which cases the roll will be cut into individual sheets as needed. A sheeting machine also may be employed subsequent to the draw rolls 15 to obviate the necessity of forming a roll. Where the laminated material has a tendency to curl toward the transparent cellulose sheeting side the laminated material may be formed into a roll with the cellulose sheeting on the outside, whereby a certain stretch is made in the cellulose sheeting.

As stated before, an etched intaglio cylinder provides a multi-cellular deposit of color, each small deposit of which appears to merge outwardly into the next deposit to form a substantially continuous deposit of a controlled quantity as distinguished from the coatings applied by calender rolls and the like. In the appended claims the type of deposit obtained by the etched intaglio cylinder will be referred to as an "intaglio" deposit. It will be understood that the multi-cellular characteristic of the intaglio deposit is not maintained as such in the laminated product. The deposited color by which the web of transparent cellulose sheeting and paper are united has an integral appearance.

Laminated products may be produced in accordance with my invention from plain transparent cellulose sheeting or from material of the "moisture-proof" type. The latter type may have a wax and gum-like coating to retard penetration of the cellulose sheeting by moisture, but the material may be employed in the manner described above for the preparation of a laminated product. In some instances, it will be found desirable to employ transparent cellulose sheeting having a "moisture-proof" coating on one side only in the production of the laminated material. Paper, having special characteristics, also may be employed, or webs of other materials may be used in the lamination.

While the method is described with respect to the lamination of regenerated cellulose to paper, it will be understood that the method also is applicable to the lamination of other materials. Since regenerated cellulose is the most difficult of the known cellulose sheetings to laminate, the invention has been described with respect to this particular material for purposes of explanation and demonstration. Various permissible changes in the method and product described are possible without departing from the scope of the invention and all such changes and modifications are intended to be included in the appended claims.

I claim:

1. The method of producing an article of the type described, which comprises maintaining a traveling web of transparent non-fibrous cellulose sheeting, depositing a quick-drying colored design in reverse on said web, drying said design, depositing a second color on said web in overall relation with respect to said web and said design, positioning said web adjacent a second web with said second color in contact therewith, and drying said webs to produce a union therebetween.

2. The method of producing an article of the type described, which comprises printing a quick-drying intaglio colored design in reverse on a web of transparent non-fibrous cellulose sheeting, drying said design, depositing a lacquer in superimposed relation with respect to said design and substantially entirely over said sheeting, and laminating a second web to said sheeting before said lacquer dries.

3. The method of producing an article of the type described, which comprises printing in reverse on a web of transparent cellulose sheeting a design in a quick-drying intaglio ink, drying said web, printing a second colored quick-drying intaglio ink on said sheeting in overall relation with respect to said first design and the printed side of said sheeting, and laminating a web of paper to said cellulose sheeting before said second intaglio ink is dry.

4. The method of producing an article of the type described, which comprises printing on a web of transparent cellulose sheeting, a quick-drying intaglio ink, depositing a coating of an adhesive material in overall relation to the printed side of said web and said ink contacting the printed side of said web with a web of paper under relatively light pressure, and subsequently subjecting the resulting composite web to a relatively high pressure.

5. The method of producing an article of the type described, which comprises printing on a web of transparent cellulose sheeting a quick-drying intaglio ink, contacting the freshly printed web with a web of paper and under relatively light pressure, and forming the resulting composite web into a roll with said transparent cellulose sheeting on the outer side thereof.

6. The method of producing an article of the type described, which comprises depositing in a multi-cellular manner an intaglio ink on a sheet of regenerated cellulose, combining said sheet of regenerated cellulose with a web of paper under relatively light pressure, and subjecting the combined sheets to relatively high pressure.

7. The method of producing an article of the type described, which comprises passing a web of cellulose sheeting in contact with a multi-cellular deposit of intaglio ink containing nitrocellulose, driving off a substantial portion of the solvents of said ink, and laminating a web of fibrous material to the printed surface of said transparent cellulose sheeting.

8. The method of producing a composite article of the type described, which comprises maintaining a traveling web of cellulose sheeting, passing said web in contact with a multi-cellular deposit of a lacquer, and laminating a second web to the lacquered side of said cellulose sheeting.

9. The method of producing a laminated article of the type described, which comprises maintaining a traveling web of transparent cellulose sheeting, printing a quick-drying colored design in reverse on said web, drying said design, passing the printed side of said web in contact with a multi-cellular deposit of an adhesive material to deposit a coat of said adhesive in overall relation with respect to said web and said design, positioning said web adjacent a web of paper with said coating in contact therewith, and maintaining said webs in contact to produce a union therebetween.

10. The method of producing a laminated article of the type described, which comprises maintaining a traveling web of transparent cellulose sheeting, passing said web in contact with a multi-cellular deposit of an adhesive material traveling at substantially the same rate as said web to deposit a coating in overall relation with respect to said web, positioning said web adjacent a second web with said coating in contact therewith, and maintaining said webs in contact to produce a union therebetween.

11. The method of producing a laminated article of the type described, which comprises printing a design on transparent cellulose sheeting with an intaglio ink, drying the design, applying in overall relation with respect to the printed side of said cellulose sheeting a pigmented solution of a cellulose derivative and an additional adhesive material, and contacting said sheeting with a fibrous web to produce a laminated product.

12. A laminated product of the type described, comprising a sheet of non-fibrous transparent cellulose sheeting having an intaglio ink design printed in reverse on one side thereof, the printed side of said sheet being bonded to a second sheet by a pigmented intaglio ink containing a cellulose compound, a plasticizer and an additional adhesive material.

13. A laminated article, comprising a sheet of transparent cellulose sheeting having a design printed in an intaglio ink in reverse on its under side, and a second web laminated to the printed side of said sheeting by an intaglio deposit extending substantially in overall relation with respect to said intaglio design and the under side of said sheeting.

14. The method of producing a laminated article of the type described, which comprises maintaining a traveling web of transparent cellulose sheeting, printing a quick-drying colored design of an intaglio ink in reverse on one side of said sheeting, drying said design, passing the printed side of said sheeting in contact with a multi-cellular deposit of an adhesive material to deposit a coat of said adhesive in overall relation with respect to the printed side of said sheeting and said design, and combining said web with a second web.

IRVING GURWICK.